United States Patent [19]

Skruhak et al.

[11] Patent Number: 5,412,785
[45] Date of Patent: May 2, 1995

[54] MICROPROGRAMMED DATA PROCESSOR WHICH INCLUDES A MICROSEQUENCER IN WHICH A NEXT MICROADDRESS OUTPUT OF A MICROROM IS CONNECTED TO THE OR-PLANE OF AN ENTRY PLA

[75] Inventors: Robert J. Skruhak; Michael E. Gladden, both of Austin, Tex.

[73] Assignee: Motorola, Inc., Schaumburg, Ill.

[21] Appl. No.: 38,046

[22] Filed: Mar. 26, 1993

Related U.S. Application Data

[63] Continuation of Ser. No. 506,982, Apr. 9, 1990, abandoned.

[51] Int. Cl.6 .................................................. G06F 9/26
[52] U.S. Cl. ..................................... 395/375; 395/800; 364/259.1; 364/262.4; 364/262.8; 364/DIG. 1; 326/44
[58] Field of Search .................. 395/375, 800; 307/465

[56] References Cited

U.S. PATENT DOCUMENTS

| | | | |
|---|---|---|---|
| 3,983,539 | 9/1976 | Faber et al. | |
| 4,338,675 | 7/1982 | Palmer et al. | 364/748 |
| 4,342,078 | 7/1982 | Tredennick et al. | 364/200 |
| 4,392,198 | 7/1983 | Shimazaki | 364/200 |
| 4,415,969 | 11/1983 | Bayliss et al. | 395/375 |
| 4,443,848 | 4/1984 | Gehman | 395/550 |
| 4,461,000 | 7/1984 | Young | 371/21 |
| 4,556,938 | 12/1985 | Parker et al. | 364/200 |
| 4,594,661 | 6/1986 | Moore et al. | 364/200 |
| 4,825,363 | 4/1989 | Baumann et al. | 364/200 |
| 4,931,989 | 6/1990 | Rhodes, Jr. et al. | 364/900 |
| 5,056,015 | 10/1991 | Baldwin et al. | 364/200 |
| 5,101,344 | 3/1992 | Bonet et al. | 395/375 |

OTHER PUBLICATIONS

Weste et al., *Principles of CMOS VLSI Design*, Addison–Wesley, Reading, Mass., 1985, pp. 368–379.
Kraft et al. "Microprogrammed Control and Reliable Design of Small Computers" ©1981 Bell Telephone Laboratories, Publisher: Prentice-Hall ISBN: 0-1-3-581140-6, Table of Contents, Chapters 1 & 2 pp. vii–89.

Primary Examiner—William M. Treat

[57] ABSTRACT

A data processor microsequencer having a non-multiplexed internal address bus is provided. The microsequencer includes a nanoROM, for providing control information to an execution unit, an entry point PLA for decoding a macroinstruction address and providing an initial microinstruction address, and a microROM, for providing the next microinstruction address during instruction sequencing. The entry PLA accesses macroinstructions from an instruction pipeline, and decodes the macroinstructions, thereby providing an initial microinstruction address for the microroutine to perform the macroinstruction. The initial microinstruction address is temporarily stored in a microprogram counter latch (uPC) and provided to the microROM or the nanoROM for decoding. The microROM decodes the initial microinstruction address and provides N output bits which are routed directly into the PLA, and subsequently provided to the uPC. The uPC selectively transfers the next microaddress to the microROM, and the microROM decodes the next microaddress, thereby providing subsequent microaddresses in the microroutine directly to the PLA. Strobe circuitry selectively activates either the microROM and the PLA, and in so doing, determines which unit provides the microaddress to the uPC.

1 Claim, 6 Drawing Sheets

MICROPROGRAMMED DATA PROCESSOR WHICH INCLUDES A MICROSEQUENCER IN WHICH A NEXT MICROADDRESS OUTPUT OF A MICROROM IS CONNECTED TO THE OR-PLANE OF AN ENTRY PLA

CROSS REFERENCE TO RELATED APPLICATION

This application is a continuation of prior application Ser. No. 506,982, filed on Apr. 9, 1990, now abandoned.

The present invention is related to U.S. patent application entitled "A Data Processor With Embedded Next State Scheduler" Ser. No. 07/461,595, filed Jan. 5, 1990 by Robert J. Skruhak et al. and assigned to the assignee hereof continued as Ser. No. 015,388 and issued as U.S. Pat. No. 5,241,637.

The present invention is related to U.S. patent application entitled "A Data Processor Microsequencer Having a Macroinstruction Decoder with Next Instruction Decode Type Information" Ser. No. 07/461,876, filed Jan. 8, 1990 by Robert J. Skruhak et al. and assigned to the assignee hereof continued as Ser. No. 079,429 and issued as U.S. Pat. No. 5,276,824.

FIELD OF THE INVENTION

The present invention relates generally to data processors, and more particularly to data processors with microcoded microsequencers.

BACKGROUND OF THE INVENTION

Typically, known data processors comprise a microsequencer and an execution unit. Data operations are performed in the execution unit, which typically comprises an arithmetic unit, registers, buses, and a data shifter. Generally, the microsequencer is either 'hardwired', i.e. designed using combinatorial logic gates, or 'microcoded', i.e. designed using a programmable memory. In a microcoded design, the user visible 'macroinstruction' of the data processor is executed by one or several microinstructions. These microinstructions control the execution unit so as to perform the function of the macroinstruction. A sequence of microinstructions, referred to as a microroutine or a microprogram, may be necessary in order to execute a complex macroinstruction.

In a typical pipelined data processor, macroinstructions are "fetched" from a main memory and stored in an instruction pipeline (PIPE) made up of "instruction registers" (IRs). The PIPE is structured such that instructions enter at one end, and the values are shifted toward the other end where they are used and then discarded. Instruction decode logic (often a programmable logic array (PLA)) accesses the instructions in the pipe and "decodes" the macroinstruction. This "decode" provides the initial microstore address of the microroutine that is to be used to perform the particular macroinstruction. At the conclusion of a microroutine, the microinstruction will request another instruction decode to determine which microroutine to execute next. This instruction decode may be a further decode of the same macroinstruction word, a decode of additional words of a multiword macroinstruction, or a decode of a new macroinstruction.

An advantage of microcode design is that the microsequencer architecture is simpler and more straightforward, and the microsequences can be easily modified by reprogramming the memory. The memory which stores the microcode is referred to as the microstore, and is often implemented as read-only-memory (ROM), or as read/write, random access memory (RAM). Generally, the ROM is divided up into two portions, a nano-ROM portion (nanoROM), which provides control information to the execution unit, and a microROM portion (microROM) which provides the next nano-ROM address during instruction sequencing. Typically, an entry point PLA provides the initial nanoROM address, which is saved in the nanoROM address latch herein referred to as a microprogram counter (uPC). Typically, the microsequencer requires a separate unique address bus for both the microROM and entry point PLA, and a multiplexor to select the appropriate source of the nanoROM address stored in the uPC. The use of two separate and unique address buses requires additional silicon area, and is therefore, expensive to implement. Furthermore, the use of two separate and unique address buses may result in bottlenecks in the routing from one physical location to the other.

SUMMARY OF THE INVENTION

Accordingly, it is an object of the present invention to provide an improved data processor microsequencer.

It is yet another object of the present invention to provide a microsequencer which reduces the number of internal address buses required to provide a next nanoaddress to a microprogram counter.

These and other objects of the present invention are accomplished in a a data processor, having a microsequencer for controlling the sequence of execution of a plurality of macroinstructions provided by an instruction unit, whereby the execution of each one of the plurality of macroinstructions is accomplished by executing a sequence of microinstructions in a microroutine, each of the microinstructions having a corresponding microaddress, the microsequencer comprising: a latching portion for storing the microaddress, and for selectively transferring the microaddress; a programmable logic array (PLA), coupled to the instruction unit and the latching portion, and selectively activated by a first strobe signal, the PLA comprising: an AND-array, coupled to the instruction unit, for receiving a selected macroinstruction, decoding the selected macroinstruction, and selecting a starting microaddress, corresponding to the microroutine for executing the selected macroinstruction; and an OR-array, coupled to the AND array and the latching portion, for receiving the starting microaddress and transferring the starting microaddress to the latching portion, in response to an output control signal, the PLA subsequently receiving a plurality of select inputs from the AND-array, and providing the starting microaddress to the latching portion, in response thereto, the OR-array subsequently receiving a predetermined number of next microaddresses in the microroutine and providing the next microaddresses to the latching portion; a storage unit, coupled to the PLA, and the latching portion, selectively activated by a second strobe signal, for receiving the starting microaddress from the latching portion, for decoding the starting microaddress, and providing the next microaddresses directly to the PLA; and enable circuitry, coupled to the PLA and the storage unit, for providing the first and the second strobe signals, in response to receiving a first control signal, and a clock signal to selectively activate the PLA and the storage unit, respectively, the enable circuitry further providing the output control signal to the OR-array, and allowing the OR-array to transfer the next microaddresses to the latching portion.

DETAILED DESCRIPTION OF THE INVENTION

Figure 1:
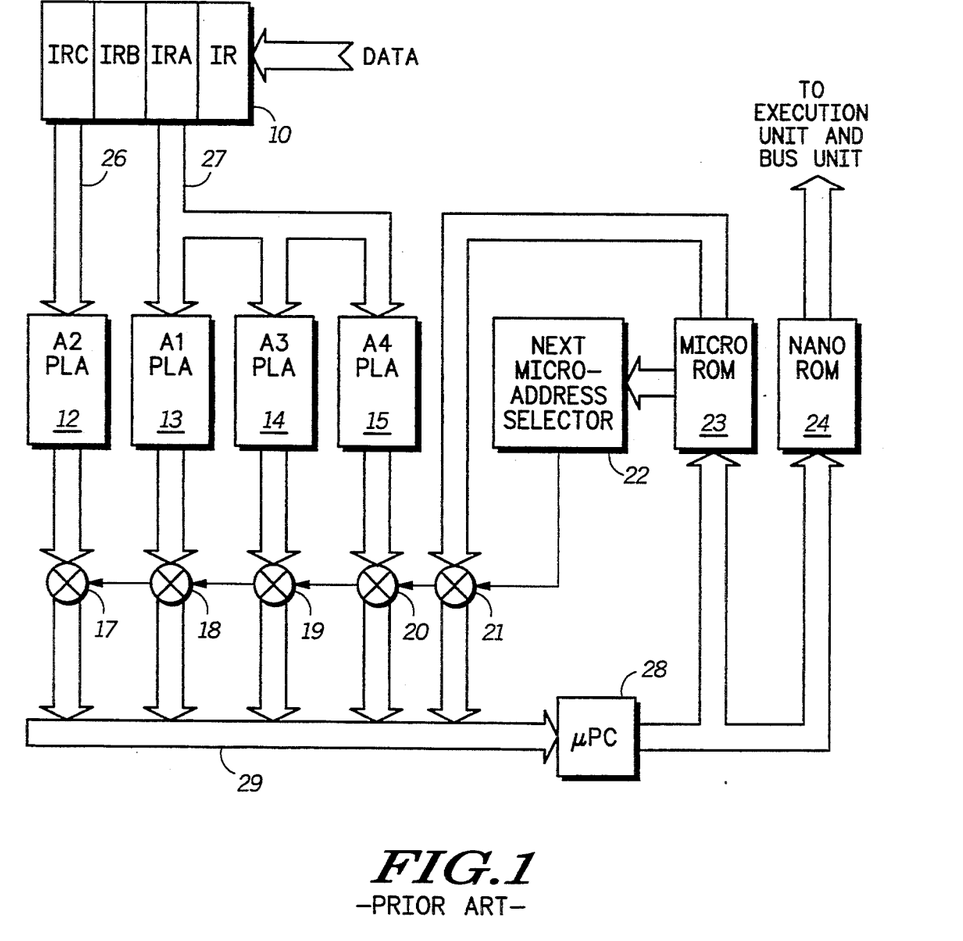
FIG. 1 is a block diagram of a known data processor microsequencer.

The block diagram of FIG. I depicts a known microsequencer as is implemented in the MC68000 and MC68020 microprocessors commercially available from Motorola Inc. Referring to FIG. 1, an instruction pipe 10 holds a plurality of macroinstructions. The contents of an instruction register C (IRC) are coupled to a decode A2-PLA 12 by a bus 26. The contents of an instruction register A (IRA) are coupled to PLAs labeled A1-PLA 13, A3-PLA 14 and A4-PLA 15 by a bus 27. The macroinstructions sequentially advance down the instruction pipe 10 thru instruction registers labeled IR, IRA, IRB and IRC. The macroinstruction advancement is controlled by microcode and/or a separate state machine (not shown) such that instruction register IRC contains the appropriate instruction word to be decoded when A2-PLA calls (defined below) are made, and instruction register IRA contains the appropriate instruction word to be decoded when A1-, A3-, or A4- PLA calls are made. PLAs 12–15 as well as a microROM 23 are active (or strobed) every microcycle (as described below) with each PLA and microROM 23 generating a next microaddress (NMA) which is defined below. An output field of microROM 23, specifying branch conditions and which if any PLA to call, is used by a next microaddress selector (NMA selector) 22 to determine which one of PLAs 12–15 or microROM 23 should supply the NMA. The NMA selector 22 enables one of five drivers 17–21 to drive a next microaddress onto a bus 29 and into a microprogram counter latch 28 (μLPC). The uPC 28 provides the address for the microROM 23 and a nanoROM 24, which together form the microstore. In the case of a direct microcode branching (defined below), driver 21 is activated and microROM 23 supplies the NMA. Whereas, for an A1-PLA call, driver 18 is activated and PLA 13 supplies the NMA. Similarly, for an A2-PLA call, driver 17 is activated and PLA t2 supplies the NMA; for an A3-PLA call, driver 19 is activated and PLA 14 supplies the NMA; and for an A4-PLA call, driver 20 is activated and PLA 15 supplies the NMA. In the case of a conditional microbranch, driver 21 under the direction of the NMA selector 22 can modify certain NMA bits coming from the microROM 23 before driving the bits onto bus 29.

In the illustrated form, the microsequencer of FIG. 1 can be thought of as having four instruction decoders 12–15. These instruction decoders may be physically implemented as separate PLAs or merged into fewer PLAs. Each PLA typically provides an address for a microroutine that either performs an effective address calculation, or that performs the actual instruction operation (for example performing the addition for an ADD instruction). An effective address (EA) is used to reference locations in a main memory (not shown). The effective address may be explicitly given, or may require calculation. The operation of the four instruction decode PLAs 12–15 is described below.

A1-PLA 13=First instruction word initial decode
A2-PLA 12=First instruction word subsequent decode
A3-PLA 14=Second instruction word decode for an F-line instruction
A4-PLA 15=Extension word effective address decode The PLAs A1-PLA 13, A2-PLA 12 and A4-PLA 15 perform the general instruction decode. This decode will typically either initiate an EA calculation routine, or an actual instruction routine. The A3-PLA 14 is used to decode F-line instructions. F-line instructions are those instructions that have their four most significant bits as logic one. These F-line instructions require a decode of both the first and second instruction words in order to determine the basic operation to be performed. Additional PLAs (not shown) may be used to generate initial addresses for special microroutines. For example, an A0-PLA (not shown) may be used to initiate special microroutines when an exception condition occurs. These exception conditions include: a reset, interrupts, error traps, tracing, illegal instructions, privilege violations, etc.

The decode requests made by the microcode, are referred to as PLA calls. Depending upon the particular instruction and EA modes used, the possible PLA calling sequences are given below in table 1. For this table the arrow (→) represents a microroutine and the A1–A4 nomenclature represents a PLA call. As shown, each microroutine (one or more microinstructions) is initiated by an (A1) call that concluded the previous macroinstruction.

(A1)→A1
(A1)→A2→A1
(A1)→A4 A2→A1
(A1)→A2→A2→A1
(A1)→A4→A2→A2→A1
(A1)→A4→A2→A4→A2→A1
(A1)→A3→A1
(A1)→A2→A2→A3→A1
(A1)→A4→A2→A2→A3→A1

Table 1- PLA calling sequences

A MOVE.W (Ax),(Ay) macroinstruction is used as a typical example. This 'move memory to memory' macroinstruction is a single word instruction that causes the data at a main memory location specified by address register Ax to be moved to a main memory location specified by address register Ay. In order to avoid confusion with the PLA numberings, Ax, Ay are used, in this example, as opposed to specific numbered address registers, (i.e. A1,A2). The previous macroinstruction concludes with a microinstruction that performs an A1-PLA call. This initial A1-PLA call initiates an effective address calculation microcode for the (Ax) portion of the instruction. This microroutine concludes with an A2-PLA call which initiates an EA calculation routine for the (Ay) portion of the instruction. At the conclusion of this routine another A2-PLA call is made which initiates the microroutine to perform the 'move' operation. At the conclusion of the move microroutine, an A1-PLA call is made which will decode and start the microroutine implementing a next macroinstruction. Accordingly, the A1-PLA 13 provides an output to the uPC 28, which is used as the NMA.

Figure 2:
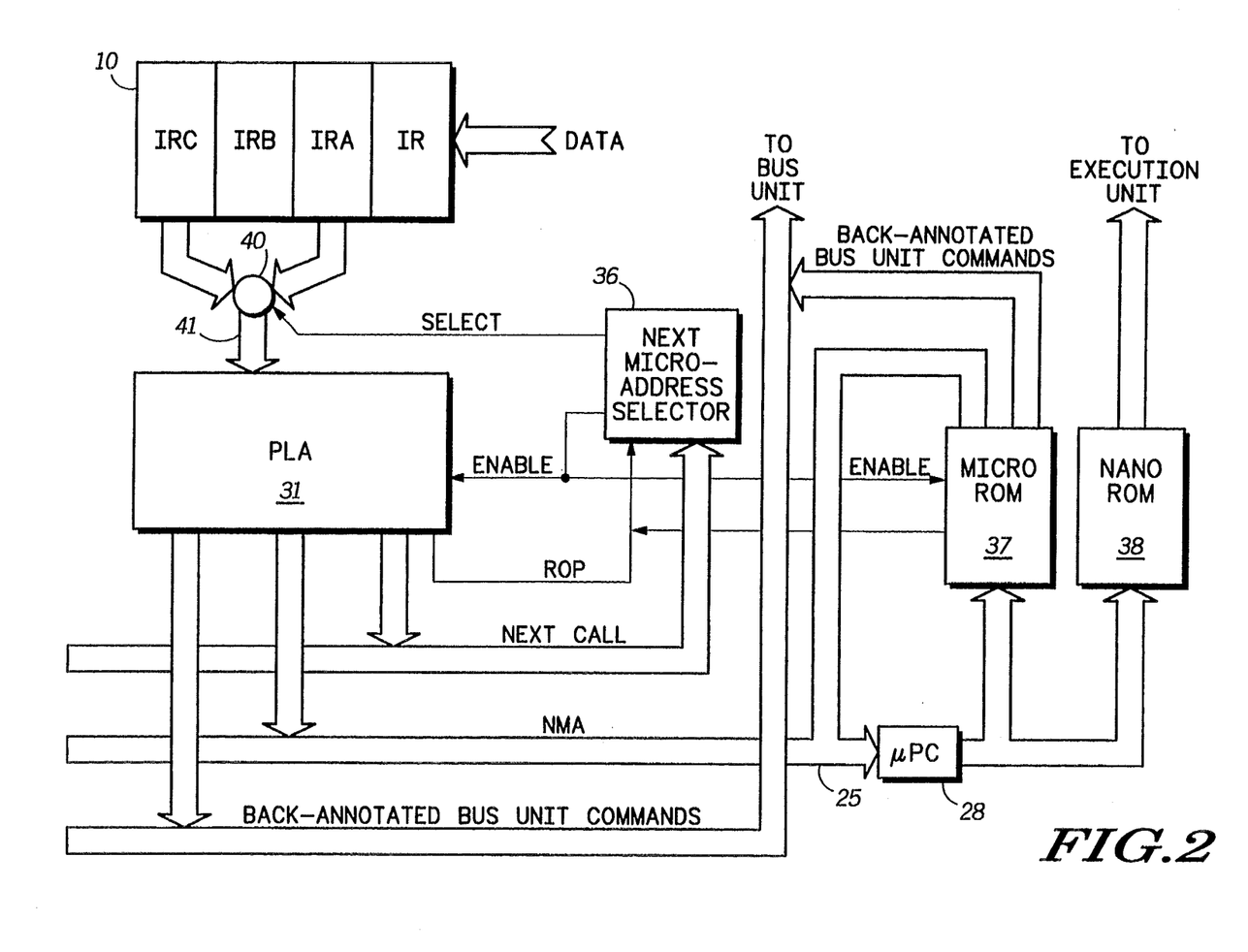
FIG. 2 is a block diagram of a data processor microsequencer in accordance with the present invention.
Figure 6:
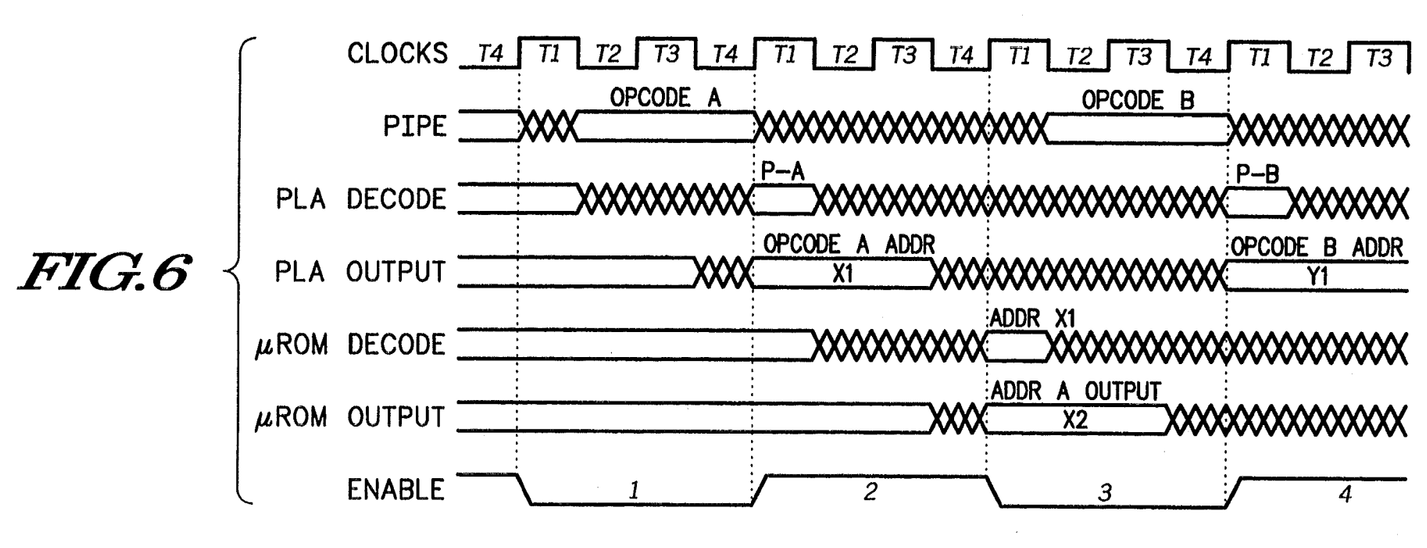
FIG. 6 is a timing diagram for the data processor microsequencer of FIG. 5.

FIG. 2 shows a block diagram of a data processor microsequencer in accordance with the present invention. Elements shown in FIG. 2 which are common with the microsequencer of FIG. 1 will be given the same number for purposes of comparison and discussion. Referring to FIG. 2, two buses previously labeled 26 and 27 going from PIPE 10 to the decode PLAs 12–15 in FIG. 1 have been replaced by an instruction register selector (IR-selector) 40 and a bus 41. The macroinstructions sequentially advance down the instruction pipeline 10. A next microaddress selector 36 controls IR-selector 40, and selects whether instruction register IRA or instruction register IRC is driven onto bus 41 and used by PLA 31. PLA 31 described herein is a single complete structure, and outputs the NMA information and additional information. This additional information includes: (1) a ROM-or-PLA (ROP) bit that specifies to selector 36 whether to activate a microROM 37 or PLA 31 for the next microcycle; (2) a NEXT CALL field (that specifies which instruction registers IRA or IRC the next microaddress selector 36 will select); and (3) "back-annotated" command fields described below. The microROM 37 outputs include: the NMA information as in FIG. 1, the ROP bit, and back-annotated bus interface unit (BIU) commands, as disclosed in a co-pending U.S. patent application entitled "A Data Processor With Embedded Next State Scheduler" Ser. No. 07/461,595, filed Jan. 5, 1990 by Robert J. Skruhak et al. and assigned to the assignee hereof. Based upon the status of the ROP signal, the next microaddress selector 36 provides an ENABLE signal to either the microROM 37 or the PLA 31. Upon receiving the ENABLE signal, either microROM 37 or PLA 31 will provide the NMA via the non-multiplexed address bus 25. As will be discussed below, the ENABLE signals selecting the PLA 31 or microROM 37 are generated early (as shown in FIG. 6) so that only the unit supplying the NMA (PLA 31 or microROM 37) is activated, thus saving power.

Figure 3A:
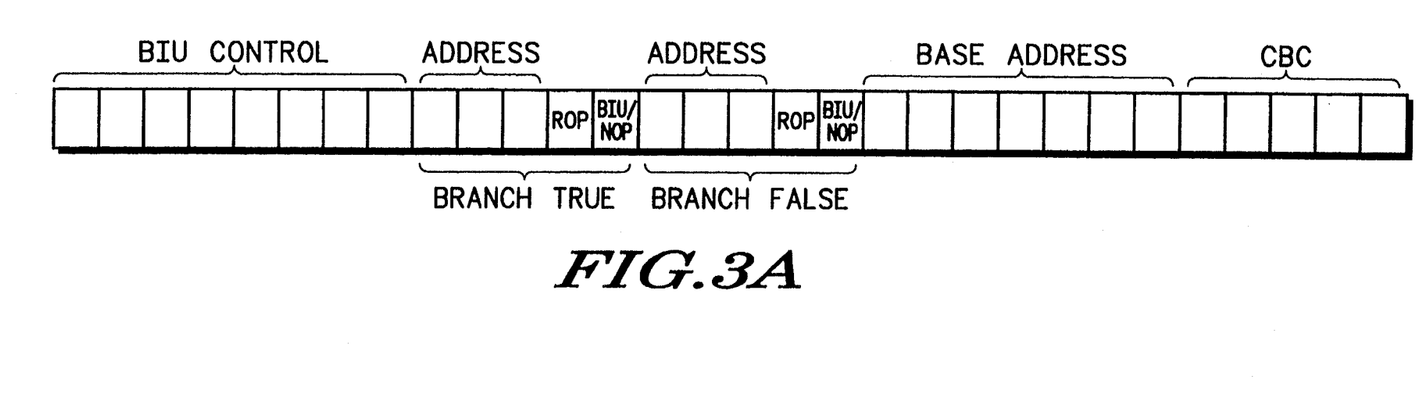
FIGS. 3A and 3B respectively, illustrate an instruction format an output microcontrol field format for a microROM and an instruction decode PLA of FIG. 2.
Figure 3B:
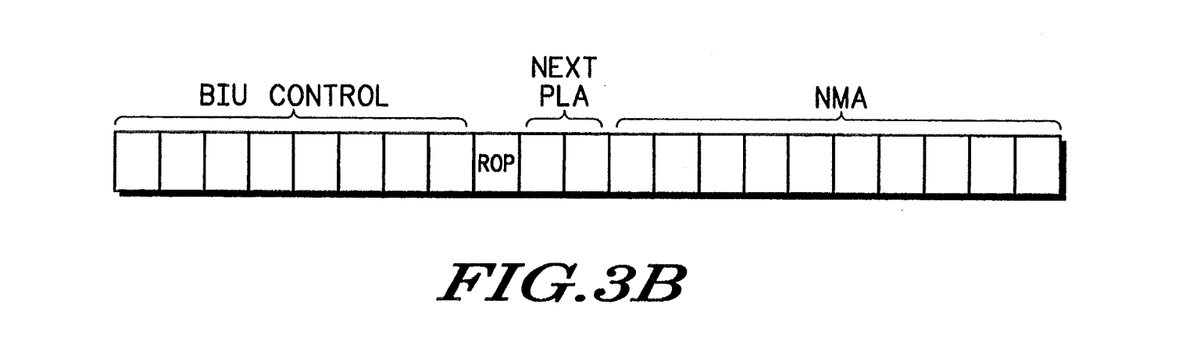

Each microinstruction has an inherent NMA or a PLA call associated with it. In the case of a microinstruction with a conditional microbranch, there are two inherent NMAs. FIG. 3A shows the microROM 37 output format and FIG. 3B shows the PLA 31 output format. In FIG. 3B, the entry PLA 31 output contains a 10-bit NMA, a 2-bit next PLA call field, a ROM-or-PLA select bit, and BIU control information (described below). The 2-bit next-PLA call field specifies which PLA call type should be issued for a subsequent PLA call. This next-PLA call information is latched in the next microaddress selector 36 and determines which of the IRA or IRC instruction registers the IR-selector 40 will select, in response to a subsequent PLA call. The ROM-or-PLA bit (ROP) determines whether to activate the microROM 37 or a PLA 31 during the next microcycle. The bus interface unit (BIU) control information specifies operand size, whether the operation is a read or write, whether the request is to be issued during the first or second phase of the microcycle, and other information relating to specific types of bus cycles. The BIU control information is "back-annotated" as will be discussed later.

In FIG. 3A, microROM 37 contains a conditional branch control (CBC) field, an NMA base address field, a branch false control field, a branch true control field, and the BIU control field. The base address field contains the seven most significant bits of the ten-bit NMA. The branch true and branch false control fields each contain: (1) the three least significant bits of the ten-bit NMA; (2) a ROM-or-PLA select bit; and (3) a "use BIU control information or no-operation" select bit. The CBC field specifies the condition to be tested for a conditional microbranch. If the condition tested is true, the branch true control field information is used to generate the NMA (a concatenation of the seven-bit base address and the three-bit branch true address), issues a BIU command and activates either the microROM 37 or PLA 31 for the next microcycle. The BIU command issued can be either the command specified by the BIU control field or a no-operation command. If the condition tested is false, then the branch false control information is used to generate the NMA, selectively issue the BIU command, and select the microROM 37 or PLA 31 for the next microcycle. Again the BIU command issued can be either the command specified by the BIU control field or a no-operation command.

Back-Annotated Bus Control Information

Certain control signals for a microcycle are "back-annotated" such that they are supplied not by the presently executing microinstruction fetch, but by the earlier fetch of the previous microinstruction. Thus, the current microinstruction fetch contains the execution unit control information for the current microcycle and the bus interface unit (BIU) control information for the following microcycle.

The Bus Interface Unit (not shown) is an autonomous unit that schedules and performs operand and prefetch bus cycles for the microsequencer. BIU control information from microROM 37 can request the BIU to perform an operand read or write operation, or request that instruction prefetching branch to a specified address. The BIU also has the ability to stall microcode execution when certain bus cycle related activities have not yet terminated (i.e. microcode wants to use the data from a read bus cycle which has not yet terminated). By back-annotating the control information, the BIU can anticipatorially schedule and prepare for upcoming bus cycles. The back-annotated BIU information also allows a conditional branch (macroinstruction) taken to start earlier (i.e. a microcycle earlier). In a known data processor architecture, the condition is tested, a microinstruction branch occurs (generating an NMA), a ROM access is made, and the "branched to" microinstruction requests that instruction prefetching branch to a specified address. A related co-pending application entitled "A Data Processor Microsequencer Having a Macroinstruction Decoder with Next Instruction Decode Type Information" Ser. No. 07/461,876 by Robert J. Skruhak et al, and assigned to the assignee hereof, discloses a data processor microsequencer wherein the back-annotated information is available at the same time the NMA for the microinstruction is available.

Previous data processor microsequencers, as depicted by FIG. 1, required at least two separate, unique address buses, and a multiplexor for selecting the appropriate source of the next microaddress (NMA) to be stored in the uPC 28. Microcycle timing is limited by the access times of ROMs 23 and 24, and the time required to generate the NMA. In order to minimize the microcycle timing, the PLA decoding is performed in parallel with the ROM accesses, so that an NMA is selected from already available outputs. Some major disadvantages of this scheme include the power consumption associated with activating or strobing all of the decode PLAs 12–15 and the ROMs 23, 24, and the timing restrictions associated with multiplexing the ROM and PLA outputs. The PLAs 12–15 operate in a precharge/discharge fashion such that signal lines within each PLA are precharged to a logic high state during one time period, and selectively discharged to a logic low state by the programmable devices within the PLAs during another time period. The microROM 23 and nanoROM 24 also function in a similar precharge/discharge manner. The PLAs 12–15 and the microROM 23 are particularly wasteful of power, in that all of the PLAs 12–15 and the microROM 23 are strobed each microcycle, but only a single PLA or the microROM 23 output is selected to supply the NMA. This described operations involves a tradeoff of sacrificing power consumption in order to obtain a high speed operation.

Figure 4:
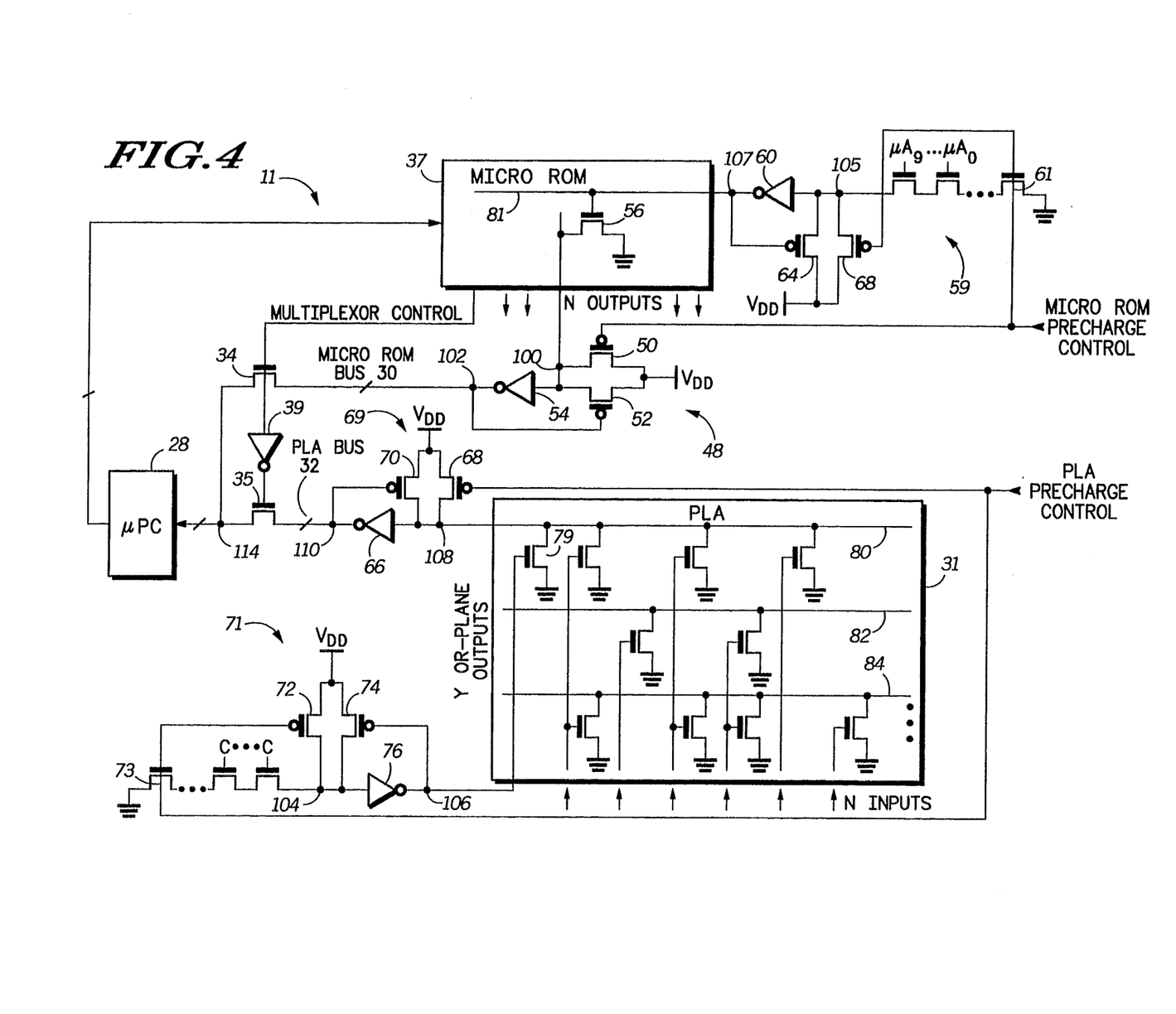
FIG. 4 is a partial schematic diagram of a data processor microsequencer having multiplexed dual address buses.

Shown in FIG. 4 is a partial schematic of an alternate embodiment for the data processor microsequencer (shown in FIG. 2) having multiplexed dual address buses. Once again, elements shown in FIG. 4 which are common with the microsequencer of FIG. 2 will be given the same number for purposes of comparison and discussion. The data processor microsequencer 11 comprises a uPC 28, a microROM bus 30, an entry PLA 31 (depicted herein as a single structure), a PLA bus 32, a multiplexor 33, a microROM 37, microROM sense amplifier 48, microROM row decoder logic 59, PLA sense amplifier 69, and PLA AND-plane decoder logic 71. Since both the microROM 37 and the PLA 31 are strobed every microcycle, MICROROM and PLA PRECHARGE CONTROL signals are simultaneously activated and deactivated to initiate the decoding activity in the microROM 37 and PLA 31, respectively. Sense amplifiers 48 and 69 are coupled to an integer N outputs of the microROM 37 and the Y OR-plane outputs of PLA 31, respectively. MicroROM sense amplifier 48 comprises two p-channel transistors 50 and 52, and an inverter 54. Transistor 50 has a source connected to a positive power supply terminal ($V_{DD}$), a gate for receiving a MICROROM PRECHARGE CONTROL signal, and a drain connected to node 100. Inverter 54 has an input terminal connected to node 100, and an output terminal connected to node 102. Transistor 52 has a source connected to $V_{DD}$, a gate connected to the output of inverter 54, and a drain connected to node 100. PLA sense amplifier 69 comprises two p-channel transistors 68 and 70, and an inverter 66. Transistor 68 has a source connected to $V_{DD}$, a gate for receiving a PLA PRECHARGE CONTROL signal, and a drain connected to node 108. Inverter 66 has an input terminal connected to a node 108, and an output connected to a node 110. Transistor 70 has a source connected to $V_{DD}$, a gate connected to the output of inverter 66, and a drain connected to node 108. Multiplexor 33 comprises two n-channel transistors 34 and 35, and an inverter 39. Transistor 34 has a source connected to node 102, a gate for receiving a MULTIPLEXOR CONTROL signal, and a drain connected to node a 114. Inverter 39 has an input terminal for receiving the MULTIPLEXOR CONTROL signal, and an output terminal for providing a complementary MULTIPLEXOR CONTROL signal. Transistor 35 has a source connected to node 110, a gate for receiving the complementary MULTIPLEXOR CONTROL signal from inverter 39, and a drain connected to node 114.

For the simplification purposes, the circuit operation of the sequencer 11 is disclosed in conjunction with a single cell in microROM 37, however, it should be readily apparent that the circuitry described is replicated N times, where N corresponds to the number of outputs of microROM 37. Accordingly, in operation, the MICROROM PRECHARGE CONTROL signal is a logic low level, during the interval of time in which the microROM row decoder 59 receives the next microaddress ($uA_0$–$uA_9$) from the uPC 28. Once the microaddress is stable, the MICROROM PRECHARGE CONTROL signal switches to a logic high level, thereby activating enable transistor 61, and thus enabling the microROM row decoder 59 to select the appropriate row in the microROM 37 (herein depicted for exemplary purposes as row 81). Transistor 56, with its gate electrode connected to row 81, becomes conductive, thereby causing node 100 to be a logic level low. Since the MICROROM PRECHARGE CONTROL signal switched to a logic level high, transistor 50 is nonconductive, therefore, inverter 54 receives the logic low at its input (node 100), and operates to provide a logic high at node 102. The logic high at node 102 causes transistor 52 to be non-conductive. Accordingly, the sense amplifier 48 provides the appropriate one (1) of N outputs onto the microROM bus 30.

Similarly, the PLA PRECHARGE CONTROL signal is a logic low, during the interval of time in which the PLA 31 receives the OPCODE information (C), at the input to the AND-plane of PLA 31. Once the OPCODE information is stable, the PLA PRECHARGE CONTROL signal switches to a logic high level, causing transistor 72 to be non-conductive, and enable transistor 73 to be conductive. Consequently, AND-plane decoder 72 operates to select the combination of OR-plane outputs (herein depicted for exemplary purposes as OR-plane bit line 80). Accordingly, transistor 73 is conductive and discharges node 104 to a logic low, thereby causing inverter 76 to provide a logic high at node 106. Transistor 79, with its gate connected to the output of the AND-plane decoder 71, becomes conductive, in response to the logic high at node 106. Consequently, the OR-plane output of bit line 80 is a logic low, and thus, the node 108 is a logic low level. Since the PLA PRECHARGE CONTROL signal switched to a logic high level (after the OPCODE information stabilized), transistor 68 is non-conductive. Inverter 66 receives the logic low at its input, and operates to provide a logic high at node 110. The weak p-channel transistor 70, with its gate connected to node 110, is therefore, non-conductive. Accordingly, sense amplifier 69 provides the appropriate one (1) of Y outputs onto the PLA bus 32.

The multiplexor 33 determines whether the next microaddress provided to the uPC 28 comes from the microROM bus 30 or the PLA bus 32. After each address decode microcycle, microROM 37 provides a MULTIPLEXOR CONTROL bit to the multiplexor 33. In the case where the MUX bit is a logic high, transistor 34 becomes conductive, thereby allowing the microROM bus 30 to provide the next microaddress to the uPC 28. In the case where the MUX bit is a logic low, inverter 39 receives the logic low at its input, and operates to provide a logic high at the gate of transistor 35. In response to the logic high at its gate, transistor 35 becomes conductive, thereby allowing the PLA bus 32 to provide the next microaddress to the uPC 28. The uPC 28 receives the next microaddress from either the microROM bus 30 or the PLA bus 32, and stores the microaddress, until the MICROROM and PLA PRECHARGE CONTROL signals switch to a logic low state. Once the precharge control signals switch, the uPC 28 provides the NMA to the microROM 37 for decoding.

Figure 5:
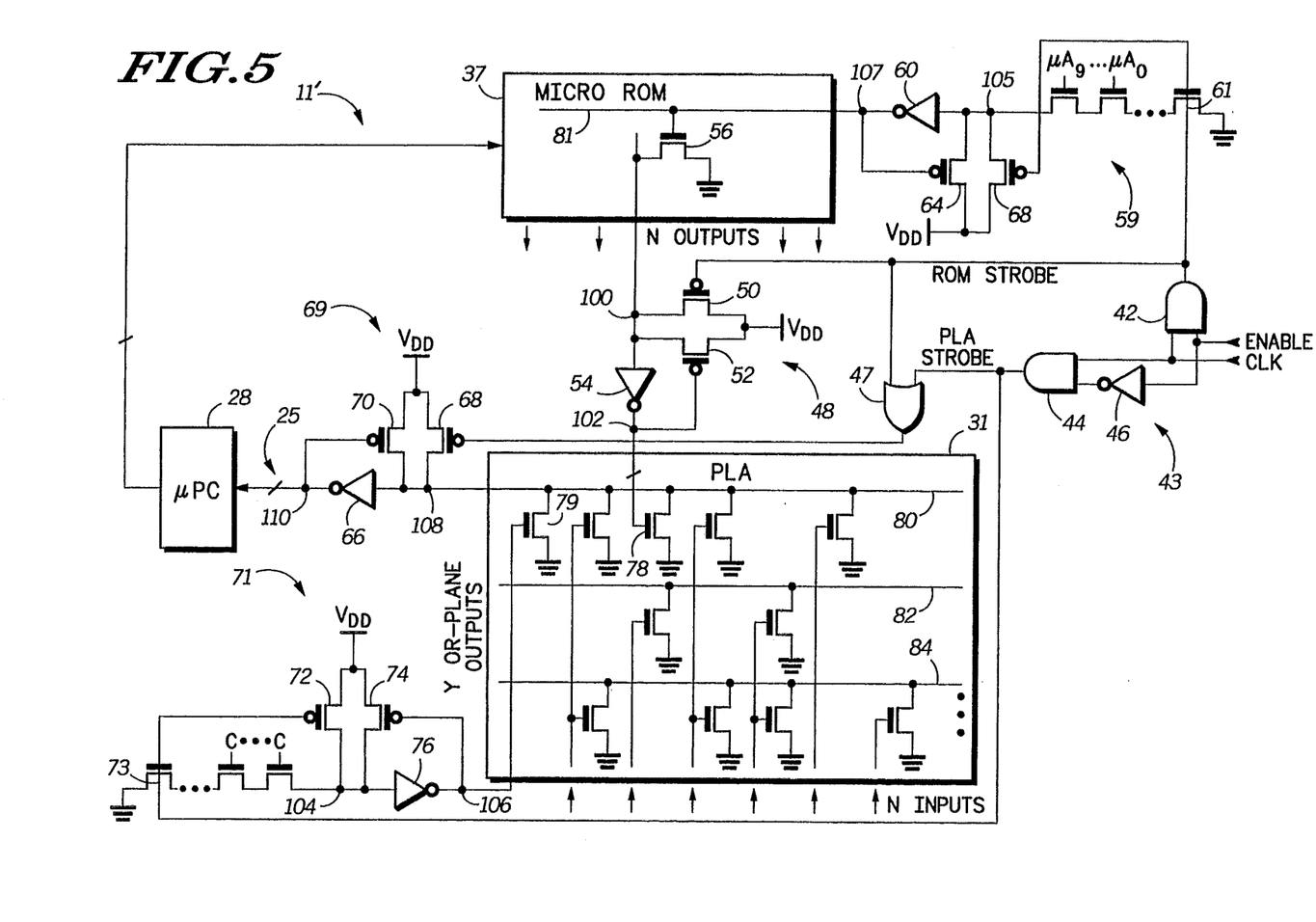
FIG. 5 is a partial circuit diagram of a data processor microsequencer having a non-multiplexed address bus.

FIG. 5 illustrates, in partial schematic form, a data processor microsequencer 11' having a non-multiplexed address bus, in accordance with the present invention. Elements shown in FIG. 5 which are common to those of FIG. 4 are given the same number. In a preferred embodiment, data processor microsequencer 11' comprises a uPC 28, an entry PLA 31 (depicted herein as a single structure), a non-multiplexed address bus 25, a microROM 37, precharge control circuitry 43, microROM sense amplifier 48, microROM row decoder 59, PLA sense amplifier 69, and PLA AND-plane decoder logic 71. In the preferred embodiment, the PLA 31 and microROM 37 are selectively activated by strobe signals generated by the precharge control circuitry 43. The operation of the precharge control circuitry 43 is determined by the status of the ROP signal provided by the PLA 31 and microROM 37, and determines which of the respective units will provide the next microaddress (NMA) onto the non-multiplexed address bus 25. Accordingly, the ENABLE signal and its complement, received at the input of AND gates 42 and 44, respectively, are derived control signals, based upon the status of the ROP signal. The precharge control circuitry 43 is comprised of a first AND gate 42, a second AND gate 44, and an inverter 46. AND gate 42 has a first input for receiving the ROP signal, a second input for receiving a clock (CLK) signal, and an output for providing a ROM STROBE signal. Inverter 46 has an input for receiving the ROP signal, and an output for providing a complementary ROP signal. AND gate 44 has a first input for receiving the complementary ROP signal from inverter 46, a second input for receiving the CLK signal, and an output for providing the PLA STROBE signal. An OR gate 47 has a first input for receiving the PLA STROBE signal, a second input for receiving the ROM STROBE signal, and an output for providing a SENSE STROBE signal to the PLA sense amplifier 69.

The precharge control circuitry 43 provides the ROM STROBE signal to the ROM sense amplifier 48, and the microROM row decoder 59. The row decoder 59 is comprised of p-channel transistors 64 and 68, an n-channel enable transistor 61, and an inverter 60. Transistor 61 has a source connected to ground, a gate connected to the output of AND gate 42, and a drain. Transistor 68 has a source connected to $V_{DD}$, a gate connected to the gate of transistor 61, and a drain connected to node 105. Inverter 60 has an input connected to node 105, and an output connected to node 107. Transistor 64 has a source connected to $V_{DD}$, a gate connected to the output of inverter 60, and a drain connected to node 105. Similarly, the precharge control circuitry 43 provides the PLA STROBE signal to the AND-plane decoder 71 for PLA 31. The AND-plane decoder 71 is comprised of p-channel transistors 72 and 74, an n-channel transistor 73, and inverter 76. Transistor 73 has a source connected to a negative power supply terminal (shown as ground), a gate connected to the output of AND gate 44, and a drain. Transistor 72 has a source connected to a positive power supply terminal ($V_{DD}$), a gate connected to the gate of transistor 73, and a drain for providing an output at node 104. Inverter 76 has an input connected to node 104, and an output connected to node 106. Transistor 74 has a source connected to $V_{DD}$, a gate connected to the output of inverter 76, and a drain connected to node 104.

The precharge control circuitry 43 also provides the strobe signals for the ROM sense amplifier 48, and the PLA sense amplifier 69. The ROM sense amplifier 48 is comprised of p-channel transistors 50 and 52, and an inverter 54. Transistor 50 has a source connected to $V_{DD}$, a gate connected to the output of AND gate 42, and a drain connected to node 100. Inverter 54 has an input connected to node 100, and an output connected to node 102. Transistor 52 has a source connected to $V_{DD}$, a gate connected to the output of inverter 54, and a drain. PLA sense amplifier 69 is comprised of p-channel transistors 68 and 70, and inverter 66. Transistor 68 has a source connected to $V_{DD}$, a gate connected to the output of OR gate 47, and a drain connected to node 108. Inverter 66 has an input connected to node 108, and an output connected to node 110. Transistor 70 has a source connected to $V_{DD}$, a gate connected to the output of inverter 66, and a drain.

In operation, microROM 37 and PLA 31 receive their strobe signals from AND gates 42 and 44, respectively. In the case where the NMA will be provided by the microROM 37, the ROP signal is a logic high level. Thus, microROM row decoder 59 is activated, and the AND-plane decoder 71 is deactivated. Accordingly, AND gate 42 receives at its input a logic high ROP signal, and a logic high CLK signal, and provides a logic level high strobe signal (ROM STROBE) to the row decoder 59 of the microROM 37, and to the microROM sense amp 48. In response to receiving the ROM STROBE signal, enable transistor 61 becomes conductive, and the row decoder 59 provides a row select signal for the microROM 37, based upon the microaddress ($uA_0$–$uA_9$) provided by the uPC 28. Thus, the microROM row decoder 59 selects the appropriate row (depicted for exemplary purposes as row 81) in microROM 37, in a conventional manner. In response to the logic high ROM STROBE signal, transistor 68 becomes non-conductive, allowing node 105 to be at a logic low level. Inverter 60 operates to provide a logic high level at node 107, thereby causing transistor 64 to be non-conductive. Transistor 56, which has its gate connected to row 81, receives a logic level high on its gate, and thus becomes conductive. Consequently, transistor 56 provides a logic level low at node 100. Since the ROM STROBE signal is logic level high, transistor 50 is nonconductive, therefore, inverter 54 receives a logic level low at its input. Inverter 54 operates to provide a logic level high at node 102, thereby causing transistor 52 to be non-conductive. The output of inverter 54 is provided to the gate of transistor 78, causing transistor 78 to become conductive.

AND gate 44 receives the CLK signal, and the inverted ROP signal from inverter 46, and provides a logic low PLA STROBE signal to the and-plane decoder 71. The AND-plane decoder 71 provides the select signal for PLA 31, in response to the OPCODE information (C). The n-channel enable transistor 73 receives the logic low PLA STROBE signal at its gate, and thus, is nonconductive. In response to the logic low PLA STROBE signal, transistor 72 becomes conductive, thereby causing node 104 to be at a logic high level. Inverter 76 receives the logic high at its input and provides a logic low at node 106, thereby causing the weak p-channel transistor 74 to be conductive, thus maintaining the output at node 106 at the logic low level. Due to the logic low level at node 106, transistor 79 is non-conductive. As described earlier, transistor 78 is conductive, thereby causing node 108 to be a logic low.

OR gate 47 receives the logic high ROM STROBE signal from AND gates 42, the logic low PLA STROBE signal from AND gate 44, and provides a logic high sense signal to the gate of transistor 68. In response to receiving the logic high signal at its gate, transistor 68 becomes non-conductive. Consequently, the logic low level at node 108 is inverted by inverter 66, thus causing node 110, the output of the PLA sense amplifier 69, to be at a logic high level. Thus, the non-multiplexed bus 25 transfers the logic high output from the PLA 31 to the uPC 28. Accordingly, when a logic high level is required at the output of the PLA sense amplifiers 69, the logic level applied to the gate of pull-down transistor 78 (by the ROM sense amplifier 48) is a logic high, thereby causing transistor 78 to discharge the or-plane 80 to a logic low state. Conversely, when a logic low level is required at the outputs of the PLA sense amplifiers 69, the logic level applied to the gate of transistor 78 is a logic low, and thus, transistor 78 is non-conductive and does not discharge the OR-plane 80. Thus, the N outputs from microROM 37 are routed directly into the entry PLA 31, and the non-multiplexed bus 25 is essentially the Y outputs from the OR-plane of PLA 31.

Shown in FIG. 6 is a the timing diagram for data processor microsequencer 11' of FIG. 5, in accordance with a preferred embodiment, representing the machine activity during the sequencing of a microroutine. As illustrated by FIG. 6, the instruction register (PIPE) sends OPCODE A to the PLA 31, during the first illustrated microcycle, in response to the ROP bit in NMA. PLA 31 decodes OPCODE A, and outputs an initial microaddress (X1) to the microROM 37, during the second illustrated microcycle. The microROM 37 decodes the initial microaddress (ADDR X1), and outputs the next microaddress (X2), during the third illustrated microcycle. Upon completion by microROM 37 of the decode for ADDR X1, the PIPE 10 sends the next OPCODE (B) to the PLA 31, during the third microcycle, and PLA 31 will perform the decode of OPCODE B, during the fourth microcycle. In this case, microROM 37 will output microaddress X2 onto the non-multiplexed dual bus 25, and the nanoROM 24 will perform the decode of X2 (not shown), as opposed to microROM 37. Since the PIPE 10 sent the OPCODE B, PLA 31 is selectively enabled, and microROM 37 is selectively disabled, during the fourth illustrated microcycle. PLA 31 decodes OPCODE B, and outputs the initial microaddress (Y1) for the microroutine for OPCODE B, during the fourth microcycle. Accordingly, microROM 37 will decode the starting microaddress Y1 during the fifth microcycle (not shown).

It should be apparent that the present invention provides a data processor microsequencer 11' which minimizes the number of internal address buses required to supply the uPC with the appropriate microinstruction addresses. In the present invention, the microROM 37 provides the next microaddress directly to the PLA 31. Essentially, the microROM bus 30, shown in FIG. 4, has been merged with the PLA bus 32 (FIG. 4), thereby eliminating the need for the multiplexor 33 (FIG. 4). Thus, the amount of silicon area required to implement the microsequencer 11' (FIG. 5) is significantly less than the silicon area required to implement the microsequener 11, shown in FIG. 4.

While the present invention has been described in a preferred embodiment, it will be apparent to those skilled in the art that the disclosed invention may be modified in numerous ways and may assume many embodiments other than that specifically set out and described above.

We claim:

1. In a microprogrammed data processor, a microsequencer comprising:
   an instruction pipe having a plurality of stages for holding macroinstructions;
   an entry PLA further comprising:
      an AND-plane having a plurality of inputs coupled to outputs of the instruction pipe and having a plurality of outputs; and
      an OR-plane having a first plurality of inputs connected to the plurality of outputs of the AND-plane, a plurality of output lines, a first plurality of transistors, each of the first plurality of transistors having a first current terminal connected to one of the output lines of the OR-plane, a second current terminal connected to a reference voltage and a control terminal connected to one of the first plurality of inputs the OR-plane, a second plurality of inputs and a second plurality of transistors, each of the second plurality of transistors having a first current terminal connected to one of the output lines of the OR-plane, a second current terminal for receiving a reference voltage and a control terminal connected to one of the second plurality of inputs of the OR-plane;
   a memory further comprising:
      an address decoder having a plurality of inputs and a plurality of outputs; and
      a memory array having a plurality of inputs, each connected to one of the plurality of outputs of the address decoder, and a plurality of outputs, each coupled to one of the second plurality of inputs of the OR-plane of the entry PLA;
   microinstruction address register having a plurality of inputs, each coupled to one of the plurality of output lines of the OR-plane of the entry PLA, and a plurality of outputs, each coupled to one of the plurality of inputs of the address decoder of the memory;
   first enable means coupled to the address decoder of the memory for receiving a first enable signal and for enabling the address in response to the first enable signal;
   second enable means coupled to the AND-plane of the entry PLA for receiving a second enable signal and for enabling the AND-plane of the entry PLA in response to the first enable signal;
   first sense amplifier means having a plurality of inputs coupled to the plurality of outputs of the memory array, a plurality of outputs coupled to the second plurality of inputs of the OR-plane of the entry PLA and an enable input coupled to receive the first enable signal; and
   second sense amplifier means having a plurality of inputs coupled to the plurality of output lines of the OR-plane of the entry PLA, a plurality of outputs coupled to the plurality of inputs of the microinstruction address register and an enable input coupled to receive a third enable signal, the third enable signal is a logical OR of the first enable signal and the second enable signal,

* * * * *